United States Patent [19]

Tangeman

[11] Patent Number: 5,106,440
[45] Date of Patent: Apr. 21, 1992

[54] METHOD FOR REPAIRING MANHOLES OR WETWALLS

[76] Inventor: Andrew F. Tangeman, 975 Highlands Blvd., Palm Harbor, Fla. 34684

[21] Appl. No.: 689,989

[22] Filed: Apr. 12, 1991

Related U.S. Application Data

[63] Continuation-in-part of Ser. No. 304,725, Jan. 30, 1989, abandoned.

[51] Int. Cl.⁵ .............................................. B29C 63/28
[52] U.S. Cl. .................................... 156/94; 156/156; 156/287; 156/294; 264/36; 264/269; 264/314; 264/573
[58] Field of Search ............... 156/294, 156, 293, 94, 156/287, 330; 52/19, 20; 264/36, 269, 516, 573, 314; 138/97, 98; 166/242, 902, 295, 277, 207, 212

[56] References Cited

U.S. PATENT DOCUMENTS

| | | | |
|---|---|---|---|
| 2,551,751 | 5/1951 | MacDougall | 156/287 |
| 3,047,065 | 7/1962 | Vincent | 166/277 |
| 3,132,062 | 5/1964 | Lang et al. | 156/294 |
| 3,135,640 | 6/1964 | Kepka et al. | 156/287 |
| 3,477,506 | 11/1969 | Malone | 166/277 |
| 3,719,230 | 3/1973 | Kemp et al. | 166/242 |
| 3,745,738 | 7/1973 | Singer | 52/20 |
| 4,135,958 | 1/1979 | Wood | 156/294 |
| 4,248,546 | 2/1981 | Danner | 52/19 |
| 4,348,247 | 9/1982 | Loyd et al. | 156/156 |
| 4,361,451 | 11/1982 | Renaud | 156/294 |
| 4,581,085 | 4/1986 | Wood | 156/294 |
| 4,581,247 | 4/1986 | Wood | 156/294 |
| 4,602,974 | 7/1986 | Wood et al. | 156/287 |
| 4,622,196 | 11/1986 | Wood | 156/287 |
| 4,671,840 | 6/1987 | Renaud | 156/294 |
| 4,680,066 | 7/1987 | Wood | 156/294 |
| 4,714,095 | 12/1987 | Müller et al. | 156/287 |
| 4,738,742 | 4/1988 | Shishkin et al. | 156/294 |
| 4,762,585 | 8/1988 | Schneider et al. | 156/294 |
| 4,770,562 | 9/1988 | Müller et al. | 156/294 |
| 4,778,553 | 10/1988 | Wood | 156/294 |
| 4,786,345 | 11/1988 | Wood | 156/294 |
| 4,861,634 | 8/1989 | Renaud | 156/294 |
| 4,956,038 | 9/1990 | Morinaga et al. | 156/294 |
| 4,956,041 | 9/1990 | Miyazaki et al. | 156/287 |
| 4,971,152 | 11/1990 | Koster et al. | 156/287 |
| 4,997,502 | 3/1991 | Schnaars | 156/287 |

FOREIGN PATENT DOCUMENTS

| | | | |
|---|---|---|---|
| 0502626 | 5/1920 | France | 212/218 |
| 0044873 | 3/1980 | Japan | 156/156 |
| 0286325 | 11/1988 | Japan | 156/294 |
| 0029526 | 1/1989 | Japan | 52/20 |
| 0043623 | 2/1989 | Japan | 52/20 |
| 0198325 | 8/1989 | Japan | 156/294 |
| 0323054 | 12/1929 | United Kingdom | 156/287 |
| 1230776 | 5/1971 | United Kingdom | 156/294 |
| 2059546 | 4/1981 | United Kingdom | 264/269 |
| 2113608 | 8/1983 | United Kingdom | 156/294 |

*Primary Examiner*—Michael W. Ball
*Assistant Examiner*—Steven D. Maki
*Attorney, Agent, or Firm*—Brooks & Kushman

[57] ABSTRACT

Cavities, such as manholes of differing sizes and shapes are repaired by an apparaatus that includes an inflatable bladder enveloped by a carrier formed of a resin-impregnated fiberglass fabric. A hoist lowers the bladder and fabric into the manhole and an air blower inflates the bladder until the fabric tightly overlies the inner walls of the manhole. The resin then cures in situ. The liner so created forms a monolithic whole that is impervious to water and silt and prevents further crumbling and deterioration of the inner surfaces of the manhole. The bladder is deflated and retracted after the resin in the fabric has cured.

4 Claims, 6 Drawing Sheets

METHOD FOR REPAIRING MANHOLES OR WETWALLS

CROSS-REFERENCE TO RELATED APPLICATION

This is a continuation-in-part patent application of prior application Ser. No. 304,725 filed Jan. 30, 1989 now abandoned.

TECHNICAL FIELD

This invention generally relates to the task of fortifying the walls of a cavity, such as a manhole or wetwell. More particularly, it relates to a repair method where a carrier, or fiberglass liner is applied to the inner walls of a defective manhole to prevent further deterioration thereof and to provide a barrier to water and silt infiltration, thereby rehabilitating the manhole.

BACKGROUND ART

Subterranean cavities, such as manholes or wetwells are usually lined with concrete, brick, wood, plastic or other materials. With the passage of time, the lining material deteriorates and eventually requires repair or replacement. In the past, workers have needed to descend into the manhole and rejuvenate it by applying concrete, plaster, gunnite, tar, paint, and other materials to the inner walls of the manhole. Such prior art repair techniques are labor-intensive and expensive. Moreover, it is difficult to completely clean the surface of the manhole walls before applying the repair material. As a result, the repair material often does not adequately adhere to such surfaces. Clumps of the repair material eventually separate from the walls and may fall into the effluent flowing through the manhole, and the repair job must then be repeated.

Especially in locations where the water table is high, water and silt tend to infiltrate the manhole through defects such as apertures and cracks formed therein. If the repair material falls into the effluent, it may enter pumps at a waste water treatment plant, thereby damaging the pumps and necessitating another costly repair or replacement effort. Over the years, the expensive cycle of patchwork repair, detachment of the repair material and repair or replacement of pumps has been repeated throughout the world because adequate repair techniques simply have not been available until now.

Influx of silt and water creates an additional problem because every drop of water entering a waste water treatment plant must be treated. Since waste water treatment plants are expensive to build and operate, any wasted capacity which is dedicated to treating ground water entering the sewer system through defective manholes needs to be eliminated.

Thus far, the only practical alternative to patchwork repair methods has been excavation, followed by the complete removal and replacement of the manhole. This has not been the repair method of choice, in part because of its expense and in part because of the traffic tie-ups and public inconvenience usually associated with the excavation process.

The patchwork repair and the complete replacement methods are primarily addressed to vertically-oriented cavities such as manholes and wetwells. In contrast, a repair method having utility in connection with the repair of horizontally extending underground pipes, rather than vertically extending manholes, is disclosed in U.S. Pat. No. 4,581,085 to Wood. In that disclosure, an inverted liner needs to be introduced into a pipe by a pull chord or wire. Using a feed tube and lubricant, numerous method steps are required to evert the liner into position within the pipe without sticking or tearing of the liner.

DISCLOSURE OF INVENTION

To avoid such prior art problems, the present invention discloses a carrier impregnated with resin is placed in overlying relation to an elastomeric bladder. The assembly is lowered under gravity into a cavity, such as a manhole or wetwell. Inflation results in the carrier being forced into tightly conformance to the walls of the cavity. After the resin has cured in situ, the bladder is deflated and removed.

The resin-impregnated carrier remains in place and prevents further deterioration of the manhole. The conforming liner so created is impervious to water and silt and thus completely seals the manhole from further water or silt intrusion. Moreover, it is substantially unaffected by the hostile environment of the manhole because it is unaffected by the gases, acids and waste chemicals commonly encountered in manholes.

In a second variation of the disclosed invention, the floor of the manhole is pre-covered with a separate piece of carrier, such as a prefabricated, resin-impregnated fiberglass fabric. The fabric is then lowered into the cavity and inflated into place, overlapping the previously applied floor covering, thereby forming a one-piece liner.

It is therefore understood that a primary object of this invention is to advance the art of manhole and wetwell maintenance by disclosing a repair method and apparatus that is fast and economical.

Another object is to provide a repair method which produces results that are effective for substantial periods of time.

Yet another object is to provide a repair method that enables a sewer system to be rehabilitated, or brought back into operation quickly after an effective repair has been made.

Still another object is to reduce the load on waste water treatments plants by providing a means for minimizing intrusion of ground water thereinto.

Other objects and advantages will become apparent as this description proceeds.

BRIEF DESCRIPTION OF THE DRAWINGS

For a fuller understanding of the nature and objects of the invention, reference should be made to the following detailed description, taken in connection with the accompanying drawings, in which.

BEST MODE FOR CARRYING OUT THE INVENTION

Figure 1:
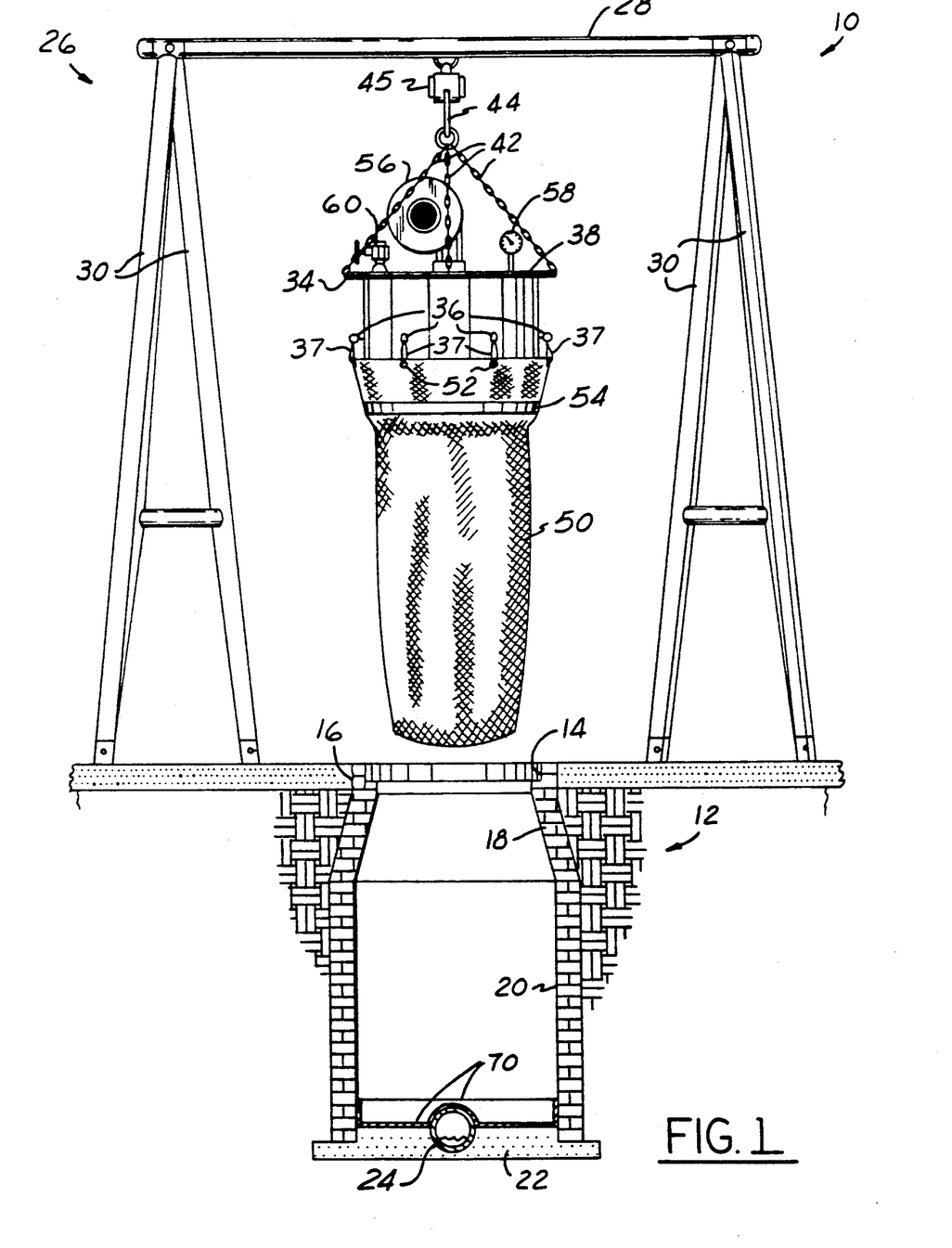
FIG. 1 is a side elevational view of an illustrative embodiment of the invention before a bladder and a carrier are lowered into a subterranean cavity, such as a manhole or wetwell.

Referring first to FIG. 1, it will there be seen that one embodiment of the invention and a typical environment within which it is used is denoted as a whole by the reference numeral 10.

A cavity, such as a wetwell or manhole to be repaired is denoted 12 and includes an annular seat 14 for the manhole cover (not shown in FIG. 1), chimney 16, corbel 18, walls 20, and floor 22 having a pipe 24 therein. Manholes vary widely in structure, so the specific dimensions of an elastomeric bladder 48 will vary accordingly.

The bladder 48 is typically produced from a 15 mil urethane film. Illustrative is that designated as "PS 8010", which is produced by Deerfield Urethane Company, located in Deerfield, Massachusetts.

A suitable support structure or hoist 26 includes a cross bar 28 that surmounts and is supported at its opposite ends by leg members that are collectively denoted 30. Support structures of many differing designs are considered to be within the scope of this invention.

Figure 2:
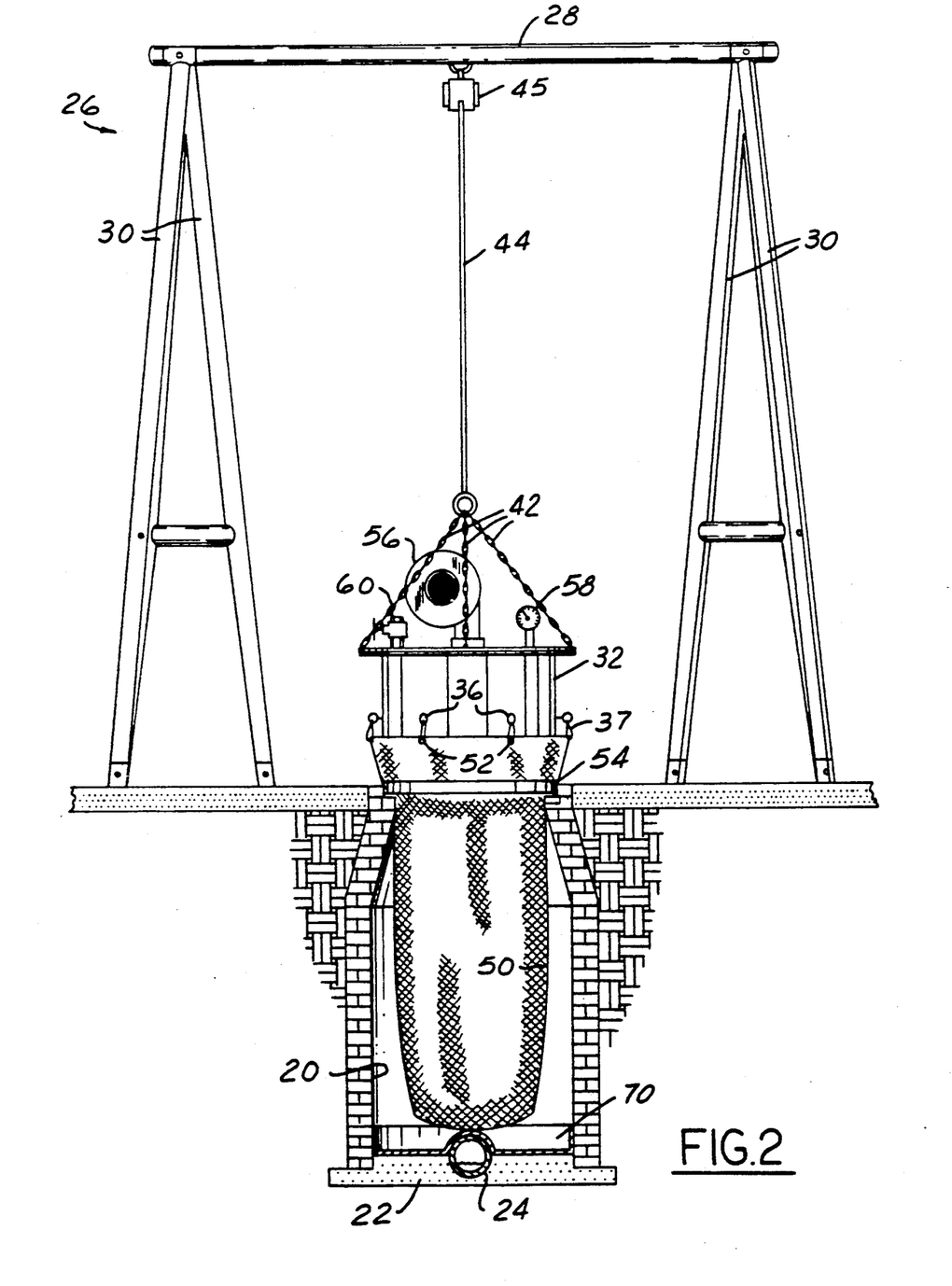
FIG. 2 shows the bladder and carrier being lowered into the manhole.
Figure 3:
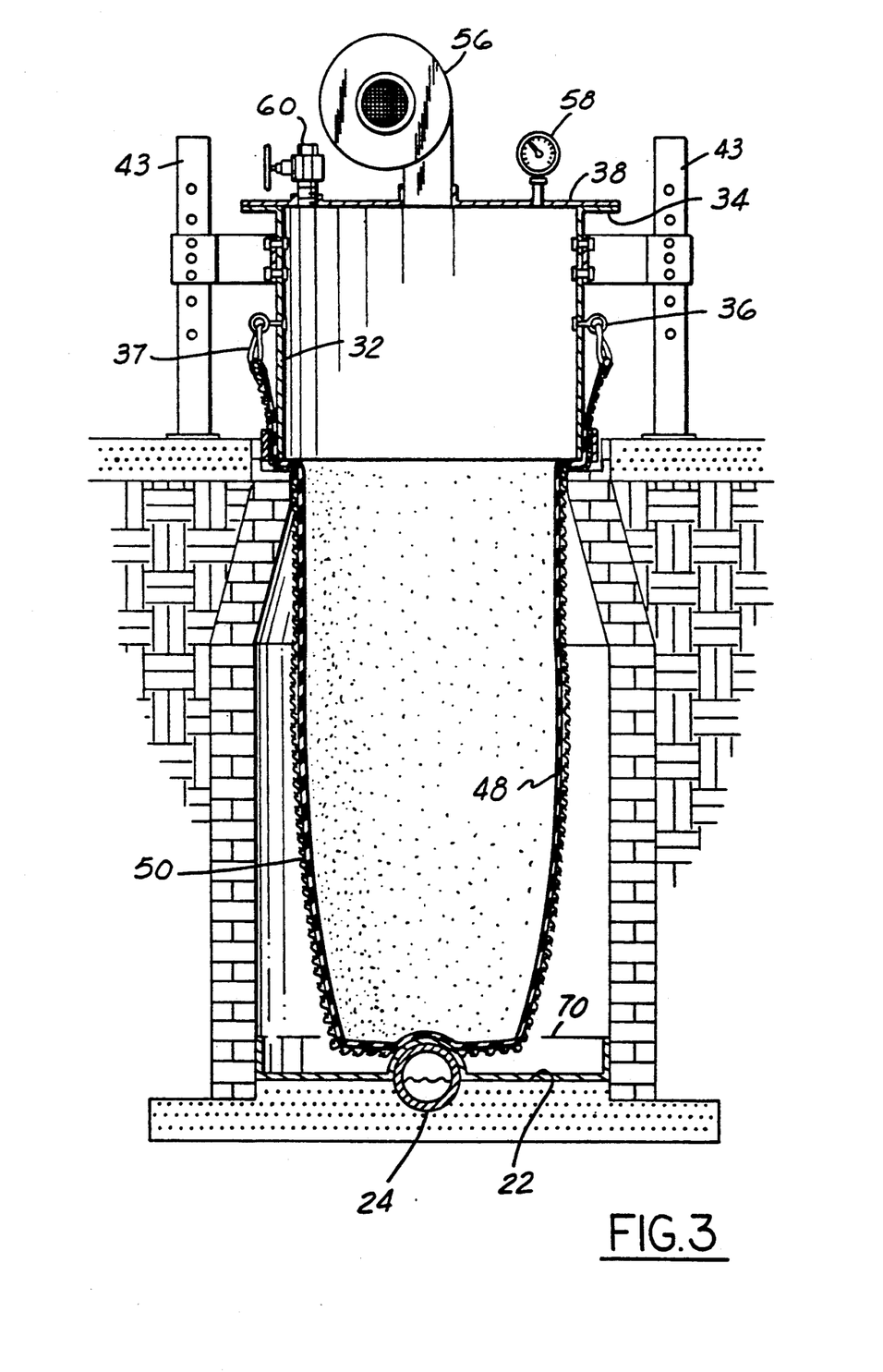
FIG. 3 shows a vertical sectional view of the bladder and carrier installed within the manhole, but before inflation of the bladder.
Figure 4:
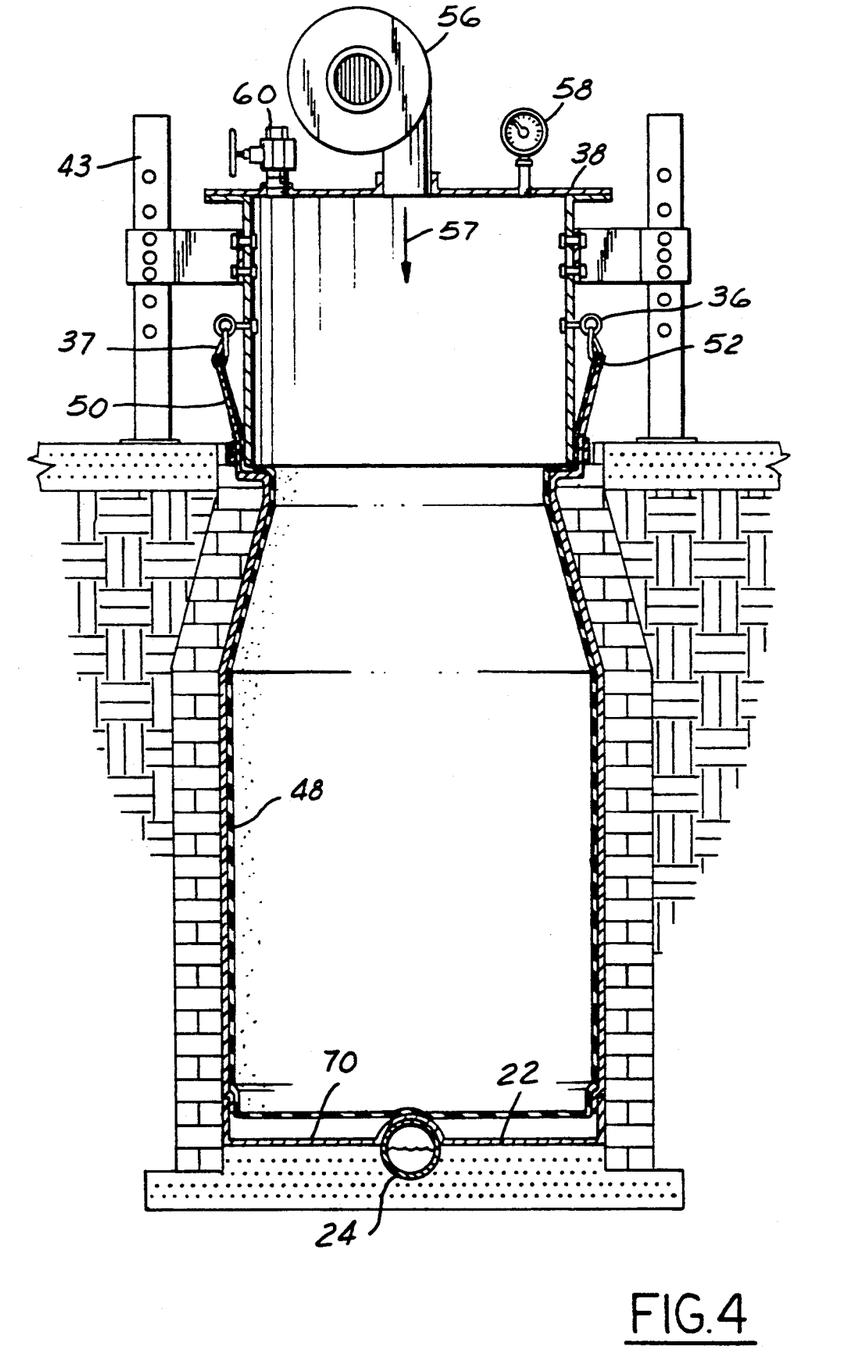
FIG. 4 is similar to FIG. 3, but shows the bladder inflated.
Figure 6:
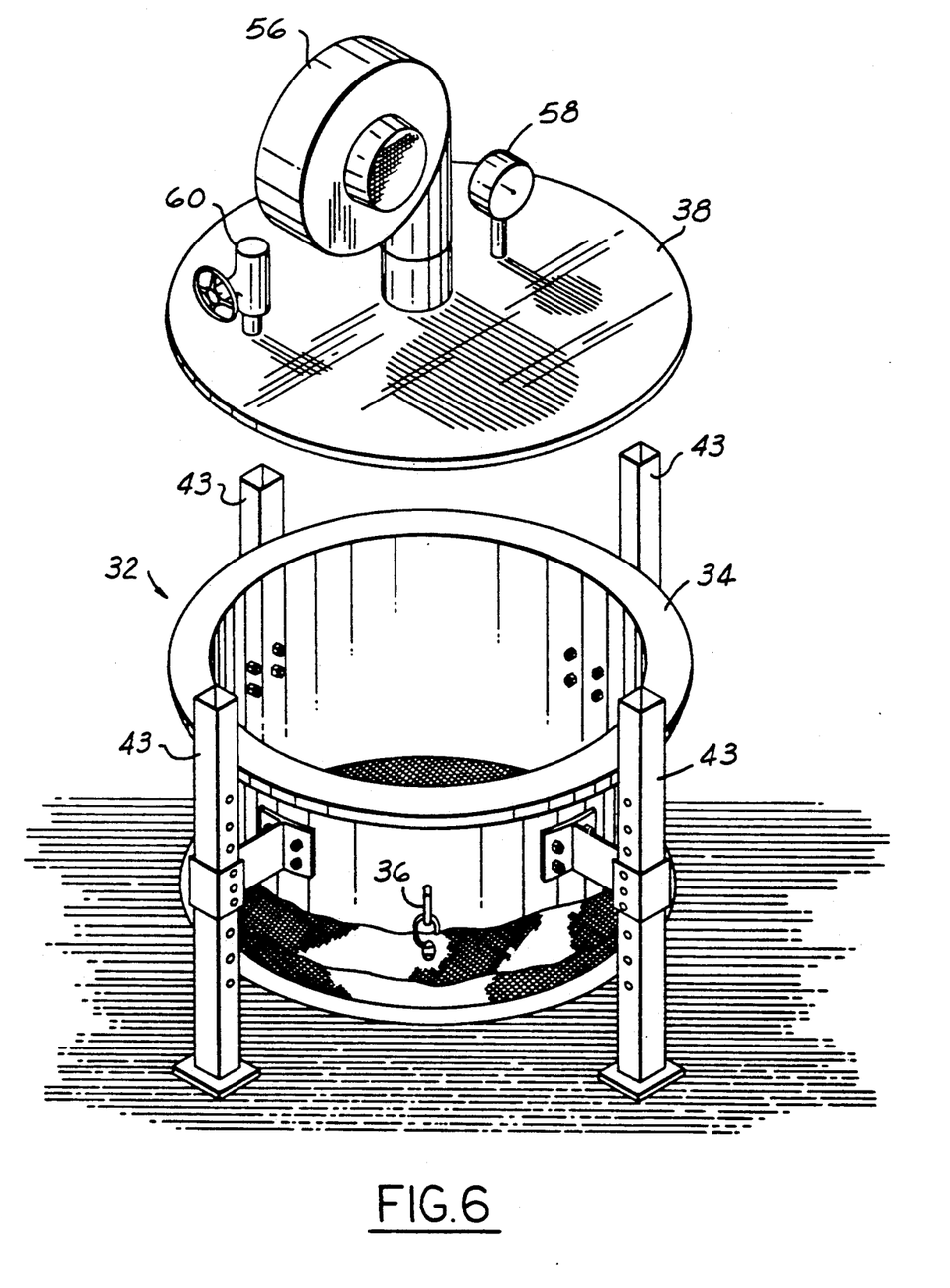
FIG. 6 is a perspective view of an air ring which may be used to practice the disclosed invention.

The apparatus further includes an air insertion apparatus or air ring 32. Air ring 32, in a commercial embodiment of the invention, is a PVC (polyvinylchloride) pipe having a radially outwardly extending annular flange 34 at the top end thereof, and a plurality of equidistantly and circumferentially spaced eyelets 36 mounted about the external periphery thereof. The top end of the air ring 32 is capped by a transparent lid 38 that is releasably but tightly secured to flange 34 by a plurality of vices or other suitable clamping means, not shown. The air ring is suspendedly supported by a plurality of connectors, such as chains, collectively denoted 42, as shown in FIGS. 1 and 2. Alternatively, a frame apparatus including vertically adjustable upstanding legs 43, as shown in FIGS. 3, 4 and 6, may be provided to stabilize the air ring.

The uppermost ends of chains 42 are supported by an elongate rope or cable 44, best shown in FIG. 2, having its uppermost end secured to reel 45 which is secured to cross bar 28 of hoist 26.

A carrier 50, in a commercial embodiment is a three-ply woven fiberglass mat. Typically in bag-form, the bag is manufactured in three layers. A middle ply of double biased glass is sandwiched between two layers of 10 ounce woven glass. Good results have been obtained where the 10 ounce glass layers are woven from a type E glass with a Volan finish. The 10 ounce layers are typically manufactured by Baymills. Usually, the middle double bias layer is a composite which is made, for example, from an 18 ounce woven glass with a Volan finish, combined with three quarters of an ounce per square foot of a glass mat. The middle double bias layer is manufactured by Hexcel.

To attach the bladder 48 to the carrier 50, both are first spread on a flat surface and cut to size for the particular application.

The bladder 48 is then enveloped by the carrier 50. Grommets 52 are then positioned about the peripheral edges of both the carrier 50 and the bladder 48. The outer peripheral edges of the carrier 50 and bladder 48 are then gathered up to form the assembly depicted in FIG. 1. The carrier 50 will be on the outside, and the bladder 48 will be on the inside of the assembly. This configuration may be thought of as a bag-like assembly, with the grommets 52 being disposed in equidistantly and circumferentially spaced relationship.

The outer peripheral edge or mouth of the assembly is placed into circumscribing relation to the air ring 32. Grommets 52 are hooked to clamps 37 that releasably engage the eyelets 36. Thus, the air ring 32 serves as a bladder-engaging means and as a carrier-engaging means. An annular band or clamp 54 is then tightly fixedly secured in circumscribing relation to the bladder/carrier assembly below the hooks and grommets to prevent air leakage.

A fiberglass resin is then applied to the carrier 50, before lowering the assembly into the manhole. The preferred resin is a two component (A, B) system.

Component A is an epoxy resin formulation. Illustrative is a formulation comprising about 80-100, preferably 95 parts by weight of an epoxy resin, such as Araldite 6010 produced by Ciba-Geigy; and 0-20, preferably 5 parts by weight of reactive diluent, such as Diluent 8 produced by Schering Berlin Polymers, Inc. of Dublin, Ohio.

The B component is a curing agent formulation, which comprises about 10-80, preferably 12.5 parts by weight of a mannich base, such as Euredur 3254 produced by Schering Berlin Polymers, Inc.; about 0-70, preferably 37.5 parts by weight of a polyamide resin, such as Euredur 3140, produced by Schering Berlin Polymers, Inc.; and about 0-10, preferably 1 part by weight of a tertiary amine, such as DMP-30 by Rohm & Haas, or Euredur 3253, again produced by Schering Berlin Polymers, Inc. The proportion of tertiary amine may be increased to accelerate the curing rate of the resin system. If an accelerating component is not used, a typical cure time may be about 8-9 hours at about 70° F.-75° F.

The Araldite 6010 is a medium viscosity, unmodified liquid epoxy resin. Araldite 6010 is an unmodified liquid epoxy resin based on bisphenol-A and epichlorohydrin. This ingredient has excellent adhesion properties, together with good chemical resistance, besides being easy to cure with a variety of different hardeners. Equivalent products and suppliers include Dow Chemical's DER-331, and Shell Chemical's EPON-828. Diluent 8 is a low viscosity, low toxicity material which is compatible with liquid epoxy resin at all levels. Equivalents of the Euredur 3140 ingredient are Ciba-Geigy's Polyamide 840, Shell Chemical's curing agent V-40, and Henkel's Versamid 140 product.

In practice, components A and B of the liner resin are mixed in the approximate ratio of 2:1 by weight for a period of at least three minutes until a uniform gray color without streaks results. The mixed resin is then poured uniformly over the carrier and rolled onto the fabric thereof using fiberglass rollers. The application process is continued for a sufficient time (at least 10 minutes) until the resin thoroughly impregnates the carrier 50.

Once the resin has been applied, the hoist 26 is activated to lower the bladder/fabric assembly into the manhole under gravity, as shown in FIG. 2. It should be noted that no eversion step or pull chord or wires or the like are needed to practice the invention.

FIG. 3 depicts the lowered assembly before bladder inflation. Once lowered into position, the chains 42 are disconnected and the air blower means is employed to introduce air into the air ring 32 and hence into the bladder 48, as indicated by the directional arrow 57 in FIG. 4. The elastomeric bladder 48 expands isometrically in all directions until the enveloping carrier 50 is pressed into tight overlying relation to the interior side walls of chimney 16, the corbel 18, manhole walls 20 and floor 22. The air pressure usually required is about ½ to 2 pounds per square inch and the time duration thereof is about three to four hours, i.e., the pressure is applied until the resin has substantially cured in situ. Pressure gauge 58 enables monitoring of the air pressure and relief valve 60 enables lowering of the pressure if it becomes excessive.

The resin will begin to cure soon after mixing and will begin to gel in about one hour at 75° F. During this interval, ample time elapses for positioning the carrier 50 in relation to the assembly. Curing can be accelerated after the carrier 50 has been positioned and held in place by air pressure, by introducing heat, thereby raising the temperature to about 150° F. inside the bladder 48. It has been found that such a temperature level allows a heat loss through the bladder-liner-resin interface while still achieving a cure temperature of about 125° F. It should be noted that the in situ-molded liner conforms to the interior walls of the cavity very closely. The only reduction of the inside diameter of the cavity amounts of about ¼-½ inch. This contrasts sharply to other methods which may cause a reduction of about 6 inches.

After curing, the bladder is removed and superfluous material cut away.

A window 38 facilitates visual inspection of the inner side walls of the bladder 48 during the repair process. If a problem (such as a wrinkled bladder) is noted through the window 38, an individual or an extended tool can be lowered into the hollow interior of the bladder 48 to correct such problems. There are no fumes to content with because the bladder 48 is impervious thereto.

Once the resin has substantially cured in situ, the carrier 50 will form a rigid monolithic whole that will prevent crumbling of the inner walls of the cavity 12, the corbel 18, and the chimney 16. Thus, the bladder 48 may be deflated once the resin has substantially cured and the fabric will continue to adhere to the inner side walls of the manhole. Once the bladder 48 has been deflated by turning off the air blower 56, the fiberglass carrier only is cut from air ring 32 below the grommets 52. The hoist is again activated to lift the air ring 32 and bladder 48 out of the manhole, leaving the fiberglass liner behind.

The cover 62 (FIG. 5) is then reinstalled and the manhole can be returned to service without further delay.

Figure 5:
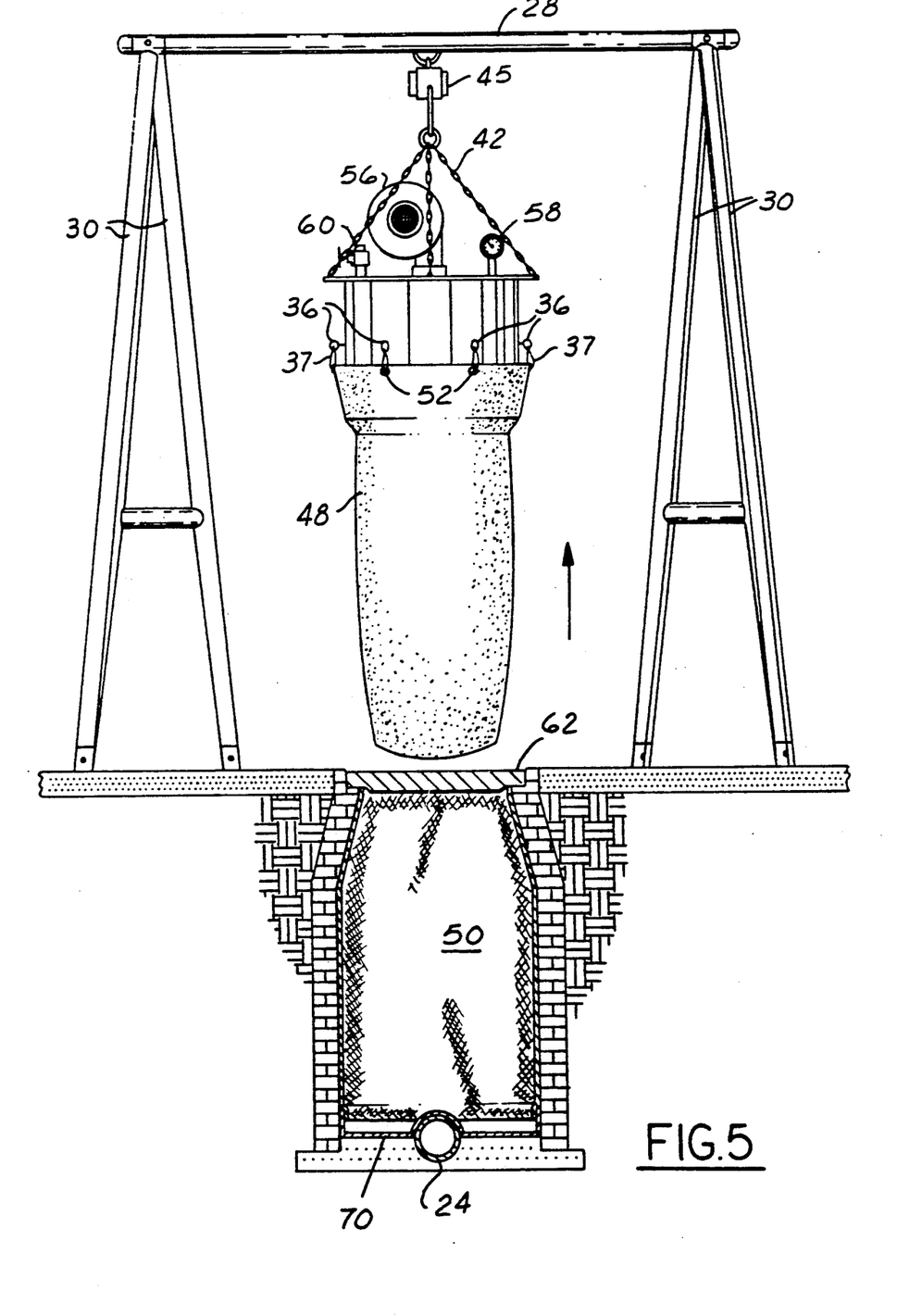
FIG. 5 shows the separation of the bladder from the in-situ cured carrier.

In a second embodiment, bladder 48 retains its bag-like configuration, but the carrier 50 does not. Instead, the carrier 50 is formed into a tubular configuration so that it is open-bottomed, as shown in FIGS. 4 and 5. When the carrier 50 is so configured, it is necessary to cover the floor 22 of the manhole 12 with a separate piece of carrier 70 before the bladder/carrier assembly is lowered under gravity into the hole. This pre-lining procedure may be employed where the pipe 24 and the floor 22 of the manhole are in an advanced state of disrepair. It should be noted, however, that this alternate method may be also utilized where the pipe and the floor are not in an advanced state of disrepair.

FIGS. 1-3 show the carrier 50 in the form of a bag and depict the floor liner 70 as a pre-installed piece, thereby indicating that both methods can be used at the same time. It will be noted that the liner 70 is upturned along its periphery to insure that it overlaps with the lowermost edge of carrier 50, as shown in FIG. 5.

The disclosed invention is particularly suitable for adaptation in locations where there is a relatively high water table, which renders most sewer systems vulnerable to infiltration. In such locations, reduced capacity from ground water and ever-present sand are constant impediments. Thus, the disclosed invention provides a means for rehabilitating, as opposed to expensive replacement of, cavities such as manholes and wetwells. By following the disclosed method steps practiced in conjunction with the apparatus discussed herein, inconvenience associated with replacement, such as traffic congestion, excavated roads, and patched pavement are avoided.

In light of this disclosure, it will be appreciated that the invention provides a permanent in situ liner for manhole rehabilitation which is installed without site excavation. The disclosed epoxy resin formulation is a coating that can be applied on dry, soaking wet, or underwater surfaces. It leaves a smooth, homogeneous film that is impervious to water and is resistent to abrasion, oils, and chemical attack. The lining eliminates all small crevices where vermin and roaches typically inhabit, thereby providing a means for elimination thereof.

In summary, the main process steps include measuring the cavity to be rehabilitated in order to quantify its dimensions and overall shape. A carrier is then prepared according to the dimensional specifications of the particular cavity. The cavity is then pressure-cleaned to prepare for liner installation. Preferably, this step should be undertaken immediately before installation. Next, the interior walls of the cavity are checked for sharp, jagged protrusions which are then levelled so that they are flush. The epoxy resin formulation may then be mixed and applied to the bladder, or around each corbel, sidewall, and outlet and onto the outside diameter of pipes or pipe liner. The carrier is then coated with additional quantities of resin.

The carrier may be spread flat in an open tray and saturated so that it is thoroughly impregnated with the resin formulation. The tray designed for this purpose is helpful in keeping the carrier clean and separated from the pavement. After saturation, the air blower is attached to an open end with S-hooks and clamps. Then, the entire unit is raised and allowed to hang over the tray until draining ceases. The bladder-carrier assembly is then lowered into the cavity.

Inflation is achieved with an air blower. Using the clear plastic lid, positioning of the assembly can be viewed during inflation.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method of repairing an inner wall and floor of a manhole, comprising the steps of:
   covering a bladder formed of an elastomeric material with a pliable fabric carrier;
   impregnating the carrier with a resin;
   lowering the carrier and the bladder into the manhole;
   expanding the bladder until the carrier conforms to the inner wall and floor of the manhole;

allowing the resin to cure in situ so that the carrier and resin form a liner which is impervious and fortifies and adheres to the inner wall and floor of the manhole;

separating the bladder from the liner; and removing the bladder from the manhole, thereby rendering the inner wall and floor thereof impervious to fluids in communication therewith and strengthening the inner wall and floor thereof so that the fortified inner wall and floor present an effective barrier to pressure exerted by subterranean fluids, whereby the manhole is rehabilitated without substantial excavation.

2. The method of claim 1, wherein the step of impregnating the carrier with a resin comprises the step of:

mixing a curing agent with the resin.

3. A method of repairing an inner wall and floor of a wetwell, comprising the steps of:

covering a bladder formed of an elastomeric material with a pliable fabric carrier;

impregnating the carrier with a resin;

lowering the carrier and the bladder into the wetwell;

expanding the bladder until the carrier conforms to the inner wall and floor of the wetwell;

allowing the resin to cure in situ so that the carrier and resin form a liner which is impervious and fortifies and adheres to the inner wall and floor of the wetwell;

separating the bladder from the liner; and removing the bladder from the wetwell, thereby rendering the inner wall and floor thereof impervious to fluids in communication therewith and strengthening the inner wall and floor thereof so that the fortified inner wall and floor present an effective barrier to pressure exerted by subterranean fluids, whereby the wetwell is rehabilitated without substantial excavation.

4. The method of claim 3, wherein the step of impregnating the carrier with a resin comprises the step of:

mixing a curing agent with the resin.

* * * * *